United States Patent
Parker

(10) Patent No.: US 6,766,992 B1
(45) Date of Patent: Jul. 27, 2004

(54) MOUNTING BRACKET FOR ATTACHMENT TO FLAT OR CYLINDRICAL SURFACES

(75) Inventor: Robert Parker, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/424,284

(22) Filed: Apr. 24, 2003

(51) Int. Cl.$^7$ ............................................... E04G 5/06
(52) U.S. Cl. ................. 248/300; 248/218.4; 248/219.1; 248/219.3; 248/219.4
(58) Field of Search ................................ 248/300, 499, 248/507, 505, 218.4, 219.1, 219.3, 219.4, 680, 911, 230.1

(56) References Cited

U.S. PATENT DOCUMENTS

| | | | | |
|---|---|---|---|---|
| 3,664,624 A | * | 5/1972 | Freegard | 248/218.4 |
| 3,884,008 A | * | 5/1975 | Miller | 52/699 |
| 4,325,529 A | * | 4/1982 | Seebinger | 248/218.4 |
| 5,174,539 A | * | 12/1992 | Leonard | 248/558 |
| 5,518,083 A | * | 5/1996 | Blennert | 182/188 |
| 5,678,797 A | * | 10/1997 | Gogan | 248/251 |
| 5,702,081 A | * | 12/1997 | Gallemore, II | 248/218.4 |
| 5,954,305 A | * | 9/1999 | Calabro | 248/219.4 |
| 5,995,364 A | * | 11/1999 | McAnally et al. | 361/685 |
| 6,065,722 A | * | 5/2000 | LeVasseur et al. | 248/230.8 |
| 6,189,488 B1 | * | 2/2001 | Goldsher et al. | 119/72 |
| 6,279,286 B1 | * | 8/2001 | Ichihashi | 52/489.1 |
| 6,302,361 B1 | * | 10/2001 | Schaefer et al. | 248/27.3 |
| 6,497,395 B1 | * | 12/2002 | Croker | 248/300 |
| 6,508,446 B1 | * | 1/2003 | Addison et al. | 248/218.4 |
| 6,581,891 B1 | * | 6/2003 | Byrd | 248/219.4 |
| 6,588,440 B2 | * | 7/2003 | Varnado | 135/120.1 |
| 6,595,477 B2 | * | 7/2003 | Roberts | 248/219.3 |

* cited by examiner

Primary Examiner—Leslie A. Braun
Assistant Examiner—Ingrid M Weinhold
(74) Attorney, Agent, or Firm—Harvey A. Gilbert; Donald G. Peck

(57) ABSTRACT

A mounting bracket is defined by three pairs of parallel planes. Each pair is orthogonal to the other two pair. The first pair provides a first plane for the mounting of an object thereto and a second plane for the attaching of the mounting bracket to a flat surface. The second and third pair are configured for use in a cooperative fashion when attaching the mounting bracket to a cylindrical surface.

7 Claims, 2 Drawing Sheets

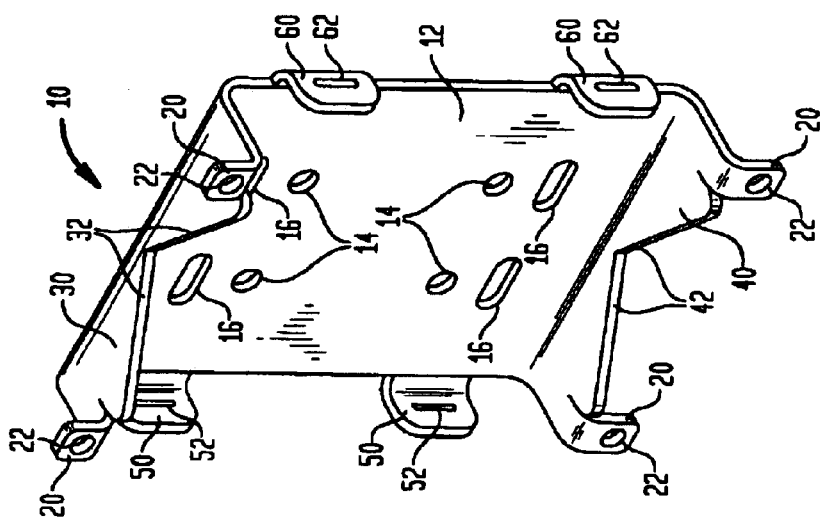
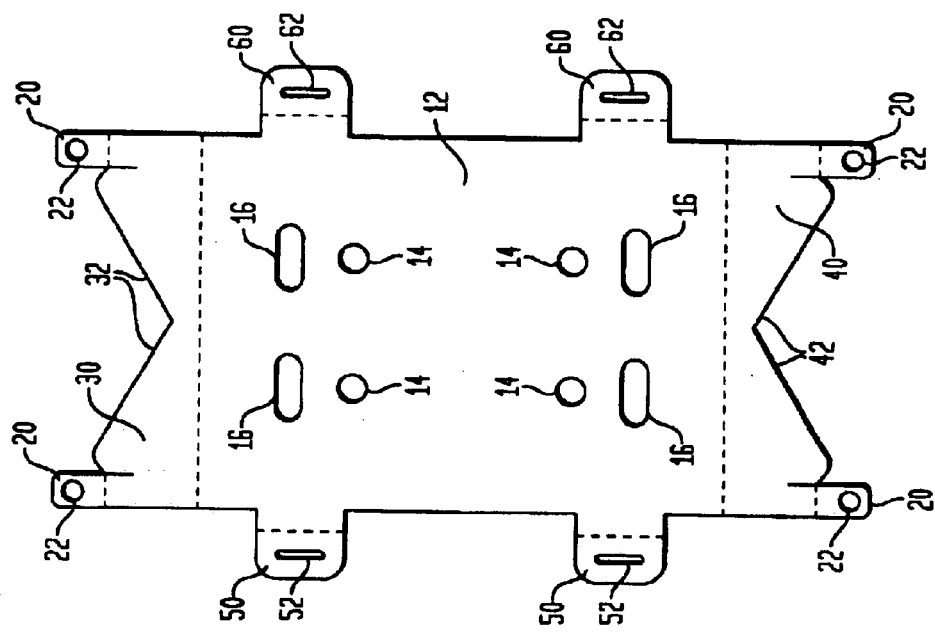

MOUNTING BRACKET FOR ATTACHMENT TO FLAT OR CYLINDRICAL SURFACES

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The invention relates generally to mounting brackets, and more particularly to a mounting bracket that can be attached to flat or cylindrical surfaces.

BACKGROUND OF THE INVENTION

Mounting brackets come in a variety of shapes and sizes, and are typically designed for the mounting of a specific device to a specific type of surface (e.g., a flat surface, curved surface such as a pole, etc.). Even the supposed "universal" mounting brackets are limited in the type of surface to which they can be mounted. Thus, conventional mounting brackets lack robustness in terms of mounting thereto and/or attachment thereof to different types of mounting surfaces.

SUMMARY OF THE INVENTION

Accordingly, it is an object of the present invention to provide a mounting bracket that can be used to mount a variety of devices to a variety of flat or cylindrical surfaces.

Another object of the present invention to provide a flat or cylindrical surface mounting bracket that is of simple design and construction.

Other objects and advantages of the present invention will become more obvious hereinafter in the specification and drawings.

In accordance with the present invention, a mounting bracket made from a rigid material that is shaped to define three pairs of parallel planes. Each pair is orthogonal to the other two pair. The first pair of the three pair of parallel planes is configured to provide a first plane for the mounting of an object thereto and a second plane to provide for the attaching of the mounting bracket to a flat surface. The second pair and third pair of the three pairs of parallel planes are configured for use in a cooperative fashion when attaching the mounting bracket to a cylindrical surface.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein:

FIG. 1 is a two-dimensional plan view of a pre-cut sheet of material used to form the mounting bracket of the present invention.

FIG. 2 is a perspective view of the mounting bracket in it's three-dimensional shape in accordance with the present invention.

DETAILED DESCRIPTION OF THE INVENTION

Figure 3:
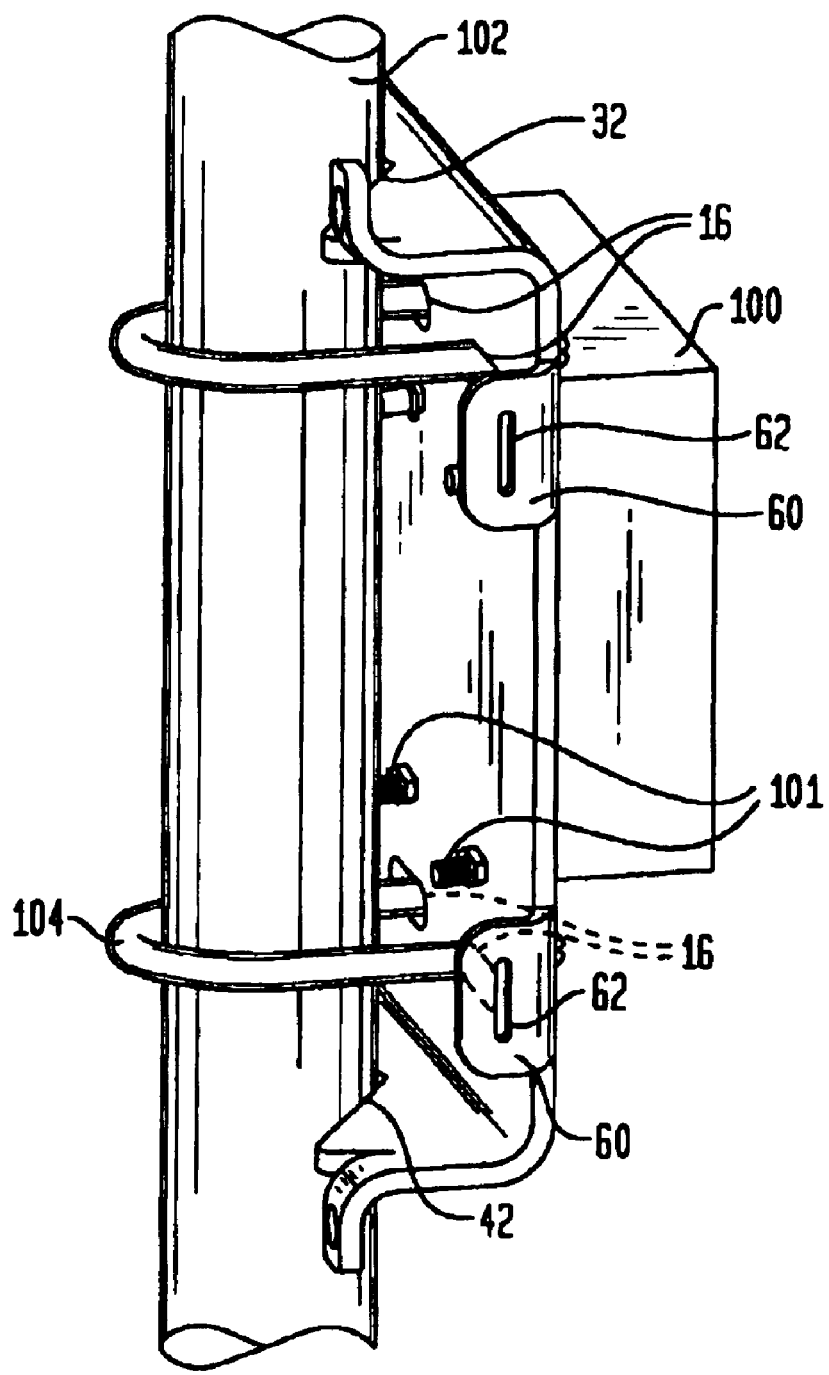
FIG. 3 is a side view of the mounting bracket attached to a cylindrical mounting surface using U-bolts.

Referring now to the drawings, simultaneous reference will be made to FIGS. 1 and 2 where the mounting bracket of the present invention is shown in it's planar, two-dimensional form (FIG. 1) and in it's three-dimensional, final product form (FIG. 2) that is referenced generally by numeral 10. In general, mounting bracket 10 is made from a rigid material (e.g., metal, plastic, composite, etc.) that can support the weight of an object mounted thereto as well as withstand the rigors of the particular environment in which mounting bracket 10 will be used. The choice of rigid material will determine the fabrication technique used to construct mounting bracket 10. For example, if metal is used, mounting bracket 10 can start as a two-dimensional sheet of material that is cut/stamped (e.g., to provide a two-dimensional blank as illustrated in FIG. 1) and bent into the end product (FIG. 2). If a plastic or composite is used, mounting bracket 10 could be made using a mold that yielded the end product as illustrated in FIG. 2. Accordingly, it is to be understood that the material and fabrication techniques used to make mounting bracket 10 are not limitations of the present invention.

Mounting bracket 10 has surfaces that define three pairs of parallel planes. For illustrative and descriptive purposes, the various surfaces will be labeled identically in each FIGS. 1 and 2 with the various bending areas used to create mounting bracket 10 being shown by dashed lines in FIG. 1. Each pair of parallel planes is orthogonal to the other two pair of parallel planes. One plane from the first pair of parallel planes is defined by a planar mounting surface 12 used to mount an object (not shown) thereto. To facilitate such mounting, a plurality of mounting holes 14 are provided through mounting surface 12. The number and (geometric) arrangement of holes 14 is not a limitation of the present invention. Mounting surface 12 can also have a plurality of slotted holes 16 that, preferably, lie outside the geometric perimeter defined by holes 14. As will be explained further below, slotted holes 16 are provided to receive U-bolts (not shown) therethrough in order to attach mounting bracket 10 to a cylindrical surface (e.g., pole).

The second plane from the first pair of parallel planes of mounting bracket 10 is defined by mounting tabs 20 which lie in a plane that is parallel to mounting surface 12. Each of mounting tabs 20 has a hole 22 provided therethrough. Mounting tabs 20 are used to attach mounting bracket 10 to a wall, floor or any other flat surface.

Mounting tabs 20 are positioned in their plane (that is parallel to mounting surface 20) by means of upper and lower opposing planar surfaces 30 and 40, respectively, that extend from the upper and lower part of mounting surface 12 at right angles thereto. Thus, planar surfaces 30 and 40 define a second pair of parallel planes of mounting bracket 10. Each of planar surfaces 30 and 40 is respectively notched (e.g., v-notch) at 32 and 42. Notches 32 and 42 are aligned with one another such that they will both abut a cylindrical surface (not shown) when mounting bracket 10 is to be attached to same.

The third pair of parallel planes defined by mounting bracket 10 is formed by slotted tabs 50 and 60. More specifically, slotted tabs 50 extend from one side of mounting surface 12 at right angles thereto while slotted tabs 60 extend from the other side of mounting surface 12 at right angles thereto. Each of slotted tabs 50 and 60 has a respective slotted hole 52 and 62 formed therethrough. Each slotted tab 50 horizontally opposes one slotted tab 60 such that an opposing pair of slotted tabs 50 and 60 has their slotted holes 52 and 62 horizontally aligned in substantially parallel fashion to planar surfaces 30 and 40. Note that while two pair of opposing slotted tabs 50 and 60 are shown, one pair or three (or more) pair could be used without departing from the scope of the present invention.

Mounting bracket 10 can be used to mount an object to a flat or cylindrical surface. In terms of mounting an object to a flat surface, the object is first attached to mounting surface 12 using holes 14 and/or holes 16. The resulting assembly is then attached to a flat surface at mounting tabs 20. To facilitate access to mounting tabs 20, those depending from upper planar surface 30 extend upward therefrom while those depending from lower planar surface 40 extend downward therefrom.

In terms of mounting an object to a cylindrical mounting surface, mounting bracket 10 presents a couple of options. For example, if the cylindrical mounting surface has a diameter that is substantially less than the width of mounting bracket 10, U-bolts can be used to attach mounting bracket 10 to the cylindrical mounting surface. More specifically, as illustrated in FIG. 3, an object 100 to be mounted is attached to mounting surface 12 using bolts 101 that Pass through holes 14 (FIG. 2) which are not visible in FIG. 3. The resulting assembly is then placed against a cylindrical mounting surface 102 such that notches 32 and 42 abut same. U-bolts 104 (having legs that are separated by a distance greater than the diameter of cylindrical mounting surface 102) are placed through slotted holes 16. Accordingly, it is preferable that slotted holes 16 are arranged in horizontally aligned pairs with each such pair being substantially parallel to planar surfaces 30 and 40. Further, slotted holes 16 are arranged in two columns as shown. In this way, mounting bracket 10 is easily "squared up" against cylindrical mounting surface 102. Note that if the size of mounting bracket 10 or weight of object 100 warrants it, additional pairs of slotted holes 16 can be provided to allow for the use of additional U-bolts.

If the cylindrical mounting surface has a diameter that is nearly equal to or greater than the width of mounting bracket 10, notches 32 and 42 abut the cylindrical mounting surface while bands or straps (not shown) are fed through slotted tabs 50 and 60. The bands or straps are used to wrap the cylindrical mounting surface thereby holding mounting bracket 10 securely against the cylindrical mounting surface.

The advantages of the present invention are numerous. The mounting bracket can be used to mount a variety of objects on flat or cylindrical surfaces without requiring the user to modify the bracket in any way. The bracket's simple, one-piece construction will make it a cost effective item for a wide variety of applications.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A mounting bracket comprising:

a sheet of rigid material having a mounting surface with a first plurality of holes provided therethrough, said first plurality of holes defining a geometric arrangement having a perimeter, said mounting surface further having a second plurality of holes provided therethrough and residing outside of said perimeter, said second plurality of holes arranged in two spaced-apart columns, said sheet of rigid material forming right angles at upper and lower ends thereof to define respective upper and lower planar surfaces depending from said mounting surface and opposing one another, each of said upper and lower planar surfaces having a notch formed therein wherein said notches are aligned with one another, said sheet of rigid material forming right angles at a plurality of locations depending from said upper and lower planar surfaces to define a respective plurality of mounting tabs that lie in a plane parallel to said mounting surface, each of said plurality of mounting tabs having a hole formed therethrough, said sheet of rigid material having a plurality of slotted tabs extending from lateral edges of said mounting surface at right angles with respect thereto, said plurality of slotted tabs arranged in two spaced-apart rows that are substantially parallel to said upper and lower planar surfaces.

2. A mounting bracket as in claim 1 wherein each of said second plurality of holes is an elongated slot.

3. A mounting bracket as in claim 2 wherein said second plurality of holes comprises:

a first pair of elongated slots horizontally aligned with one another and substantially parallel to said upper and lower planar surfaces; and a second pair of elongated slots horizontally aligned with one another and substantially parallel to said upper and lower planar surfaces.

4. A mounting bracket as in claim 1 wherein each of said notches is a v-notch.

5. A mounting bracket as in claim 1 wherein said plurality of mounting tabs depending from said upper planar surface extend upward therefrom, and wherein said plurality of mounting tabs depending from said lower planar surface extend downward therefrom.

6. A mounting bracket comprising:

a rigid material shaped to define three pairs of parallel planes with each pair from said three pairs being orthogonal to the other two pair of said three pairs, said rigid material that forms a first pair of said three pairs of parallel planes being configured to provide a first plane for the mounting of an object thereto and a second plane to provide for the attaching of said mounting bracket to a flat surface, said rigid material that forms a second pair and a third pair of said three pairs of parallel planes configured for use in a cooperative fashion when attaching said mounting bracket to a cylindrical surface wherein said rigid material that forms said second pair of parallel planes is notched to abut the cylindrical surface when said mounting bracket is attached thereto, and wherein said rigid material that forms said third pair of parallel planes has horizontally-aligned holes formed therethrough.

7. A mounting bracket as in claim 6 further comprising a plurality of elongated slots provided through said rigid material in said first plane of said first pair of parallel planes for cooperative use with U-bolts.

* * * * *